United States Patent [19]

Harte

[11] 4,453,920

[45] Jun. 12, 1984

[54] INSTRUCTIONAL APPARATUS WITH MULTIPLE TYPES OF FEEDBACK

[76] Inventor: J. Richard Harte, 10 W. Concord, Kansas City, Mo. 64112

[21] Appl. No.: 385,298

[22] Filed: Aug. 2, 1982

[51] Int. Cl.³ .............................................. G09B 7/06
[52] U.S. Cl. ..................................... 434/334; 434/338
[58] Field of Search ............... 434/334, 335, 338, 340, 434/341

[56] References Cited

U.S. PATENT DOCUMENTS

| | | | |
|---|---|---|---|
| 1,644,160 | 10/1927 | Thompson | 434/334 |
| 2,943,400 | 7/1960 | Griswold | 434/338 |
| 3,057,082 | 10/1962 | Wellington et al. | 434/338 |
| 3,139,688 | 7/1964 | Roop | 434/334 |
| 3,141,244 | 7/1964 | Smith | 434/338 X |
| 3,177,595 | 4/1965 | Yonker et al. | 434/334 |
| 3,206,871 | 9/1965 | Schure et al. | 434/338 X |
| 3,280,482 | 10/1966 | Johnson | 434/334 |
| 3,747,229 | 7/1973 | Harte | 434/334 |
| 3,754,337 | 8/1973 | Harte | 434/334 |
| 3,902,255 | 9/1975 | Harte | 434/334 |
| 3,949,489 | 4/1976 | Gallucci | 434/338 |
| 3,955,290 | 5/1976 | Filer | 434/338 |
| 3,964,176 | 6/1976 | Harte | 434/334 |
| 4,010,553 | 3/1977 | Bennett | 434/338 |
| 4,065,858 | 1/1978 | Harte | 434/334 |
| 4,164,078 | 8/1979 | Goldfarb | 434/335 |

Primary Examiner—William H. Grieb
Attorney, Agent, or Firm—D. A. N. Chase; Michael Yakimo, Jr.

[57] ABSTRACT

An instructional apparatus is disclosed comprising a holding frame having a grid of shallow and deep depressions or holes, the bottoms of which are defined by electrical contacts; a printed instructional format that contains circular response areas or zones that are precisely located over some of the shallow and deep depressions when the format is properly positioned on top of the holding frame; an electroconductive stylus with a cone shaped tip; a punching sheet that is sandwiched between the printed format and the holding frame and that obscures the depth of the underlying shallow and deep depressions from the student; and the necessary electrical components and connections to register and indicate when the tip of the stylus completes an electrical circuit by contacting the electroconductive contact material in the bottom of each shallow and deep depression. Electrical circuits are thereby closed at two different depths, one depth indicating correctness of response and the other depth indicating incorrectness of response. With this invention, multiple types of feedback are attained by activating different electrical components, plus the cone shaped tip of the stylus produces small and large holes in the punching sheet at the selected response areas depending on its depth of penetration.

8 Claims, 4 Drawing Figures

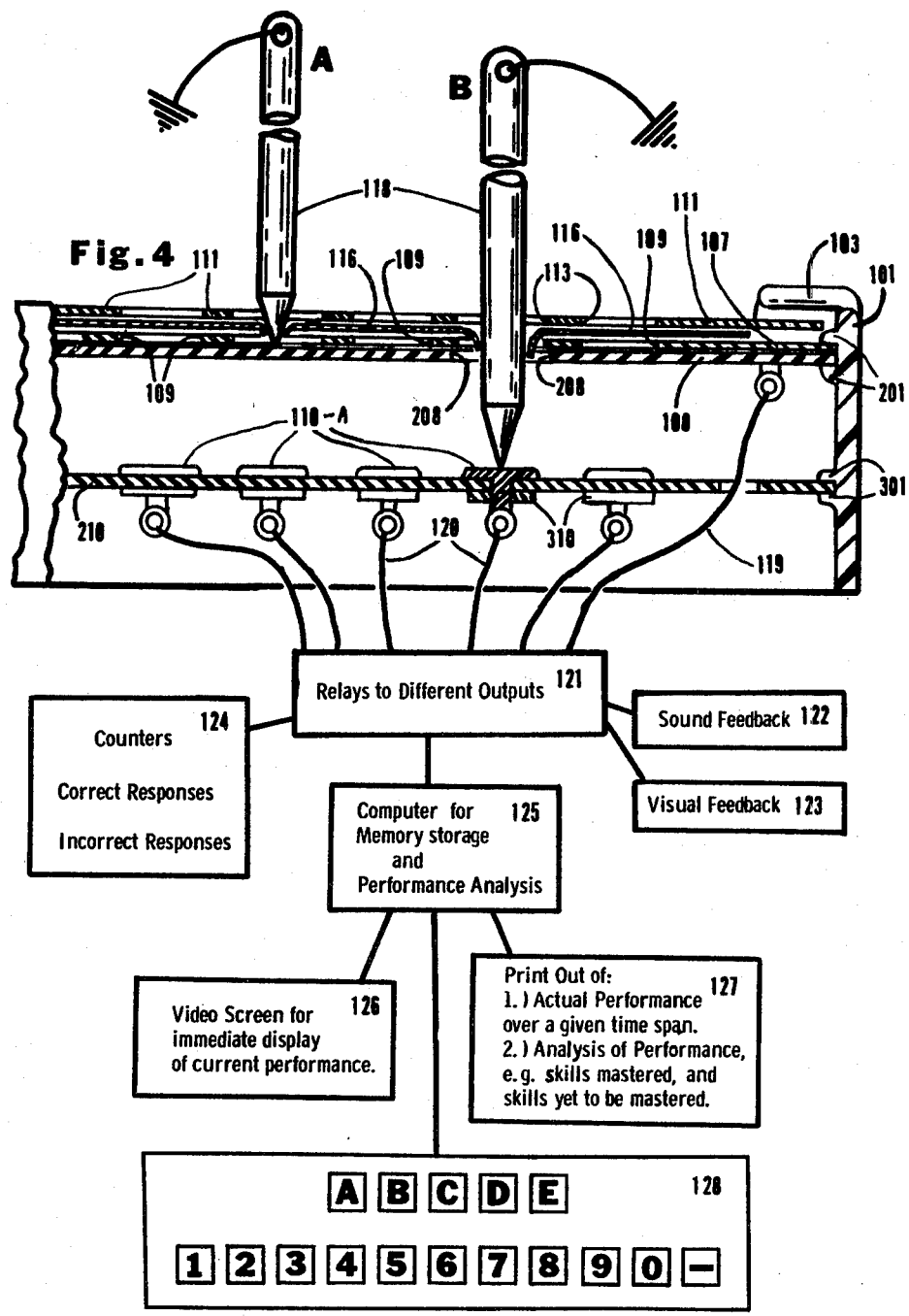

INSTRUCTIONAL APPARATUS WITH MULTIPLE TYPES OF FEEDBACK

PRIOR ART

Gallucci—U.S. Pat. No. 3,949,489
Filer—U.S. Pat. No. 3,955,290
Goldfarb—U.S. Pat. No. 4,164,078
Bennett—U.S. Pat. No. 4,010,553
Thompson—U.S. Pat. No. 1,644,160
Johnson—U.S. Pat. No. 3,280,482
Severin—U.S. Pat. No. 3,520,074
Harte—U.S. Pat. No. 3,747,229
Harte—U.S. Pat. No. 3,754,337
Harte—U.S. Pat. No. 3,902,255
Harte—U.S. Pat. No. 3,964,176

This invention relates to improvements in instructional apparatus of the types disclosed in the above referenced patents.

My prior work in educational self-instructional and self testing apparatus having immediate response feedback includes the development of a holding mechanism with holes or depressions in its upper surface, said holes being of different depth, or different shapes. These holes or depressions of different shapes or depths are covered by a printed format, or by a printed format that has holes punched in it and with a blank or unprinted sheet placed between the printed format and the holding frame that contains holes or depressions of different depth or shape. The user then uses a stylus to make holes in the printed format, or in the blank sheet that lies between the printed and punched format and the holding frame. The correctness or incorrectness of the student's response is immediately indicated to the user by the depth of penetration of the stylus through the printed format, or through the blank sheet, or by the size of the hole produced in the sheet, or by the shape or configuration of the hole produced in the sheet through which the stylus is pushed.

Though the apparatus produced under the above patents is a useful addition to the art of instructional devices, or self testing devices, it is felt that this invention represents an improvement in this type of instructional apparatus, in that it is constructed to provide the student with additional types of feedback, and provides for linkage with a computer that can remember the types of correct and incorrect responses the student has made, the student's code number, the instructional format code number, the date, and other significant data; and this data can be kept in the computer's memory. And when the computer is so directed it can give a progress report on the student's performance as to the types of correct and incorrect responses the student has made in a given area of knowledge and skill, and also analyze the student's performance in reference to a given set of criteria.

It is therefore the primary object of this invention to provide an instructional apparatus that gives the student multiple types of feedback as to the correctness or incorrectness of responses, and also analyize the student's performance in different areas of knowledge and skill, and further gives the student and his or her teachers information as to what areas of knowledge or skill have been mastered, and what areas need to be learned.

Other objects and uses of the present invention will become apparent to those skilled in the art upon a perusal of the following specification in the light of the accompanying drawings in which:

FIG. 4 is a side view of the instructional apparatus shown in FIG. 3, with parts broken away to reveal details of construction of this version of the apparatus, in conjunction with the schematic illustration of the different electrical components used in this invention.

DETAILED DESCRIPTION

Figure 1:
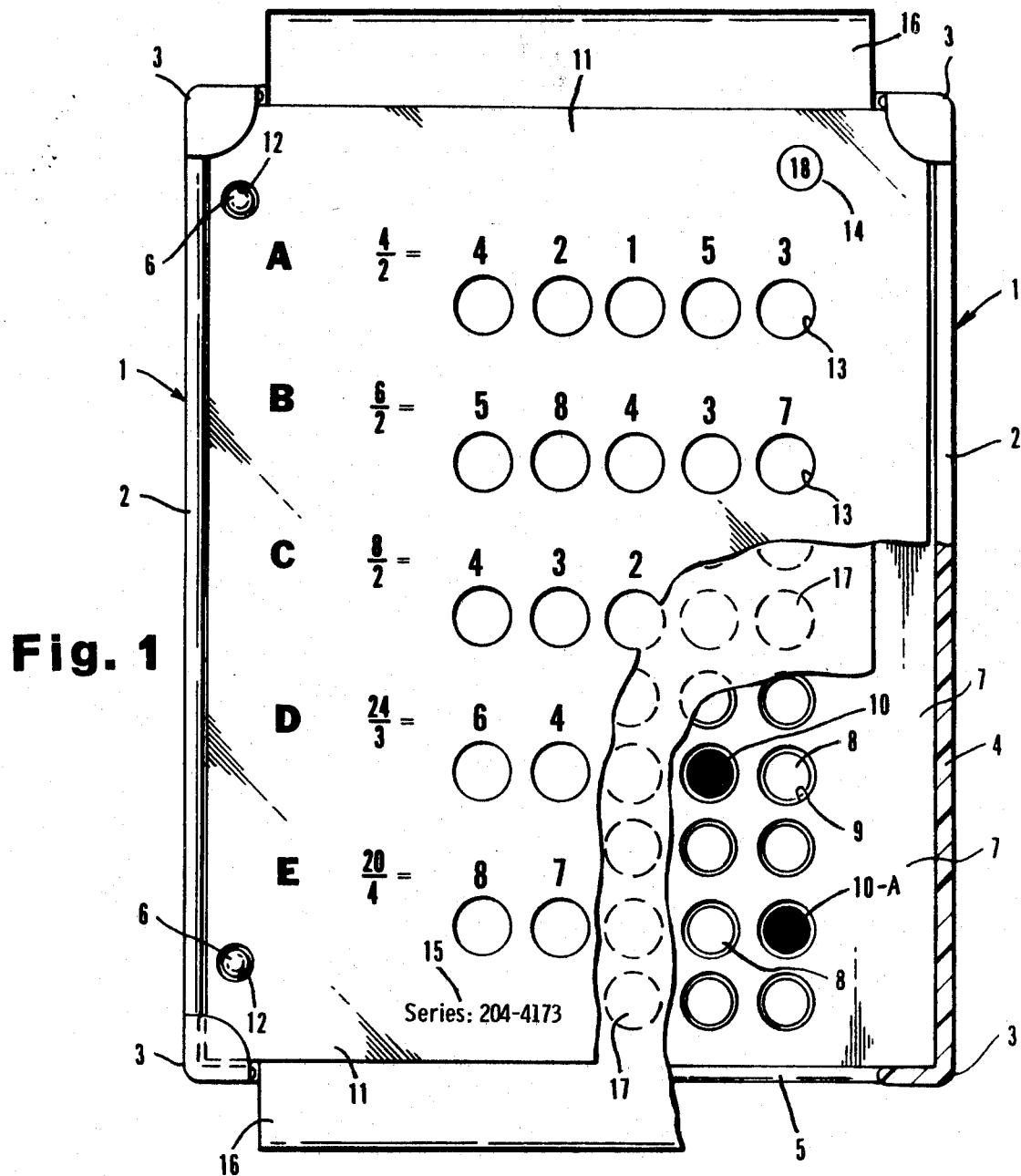
FIG. 1 is a plan view of one version of the apparatus with parts broken away to reveal details of construction.
Figure 2:
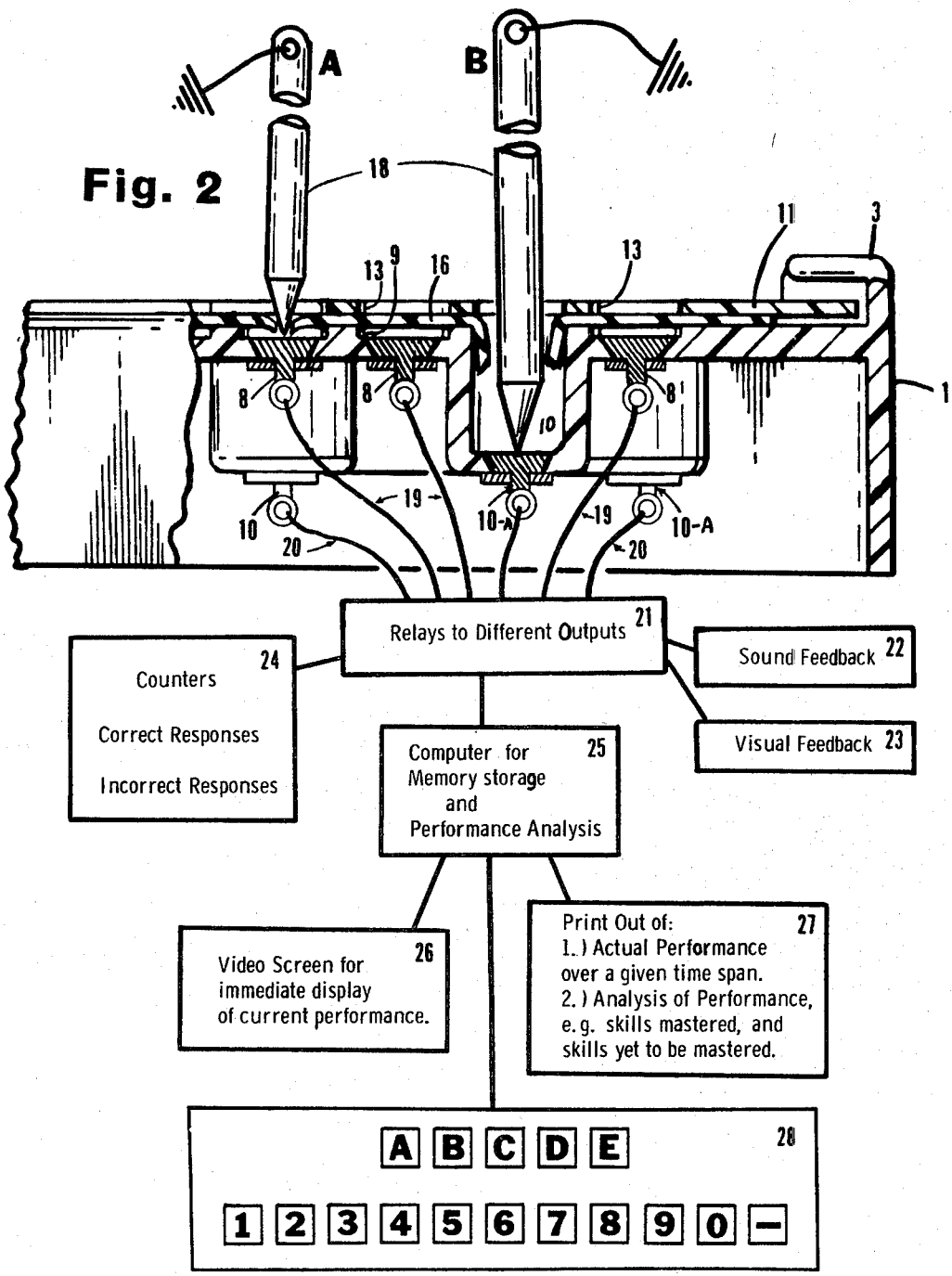
FIG. 2 is a side view of the instructional apparatus shown in FIG. 1, with parts being broken away to reveal details of construction of this version of the apparatus as it is used in conjunction with a schematic illustration of the different electrical circuits and electrically operated mechanism used in this invention.

Referring to FIGS. 1 & 2, an instructional sheet comprises a printed format 11, containing five rows of pre-punched openings or zones 13, for answer selections, and pre-punched openings or zones 12 as alignment holes. The printed material on printed format 11, is five questions that require the reduction of fractions to whole numbers. For each of the five questions: A,B,C,D, & E, which have been printed on the surface of format 11, there are five possible selections, of which only one selection is correct. The prepunched openings 13, on format 11, are all located so that openings 13, are immediately over either shallow holes 9 or deep holes 10 in a flat, horizontal base member integrally formed with holding frame 1. Printed and prepunched format 11, is held in proper allignment by positioning pins 6, that fit through prepunched holes 12, and also by ridges 2 along each side, and corners 3, which have an overhanging lip. Between printed and prepunched format 11 and the upper surface 7 of the base member of holding frame 1, is sandwiched a blank sheet of paper 16 that effectively hides the depth of depressions or holes 9 and 10 from the student. In the bottom of shallow holes or depressions 9 are electrical contact elements in the nature of electroconductive inserts 8, and in the bottom of deep holes or cavities 10 are electrical contact elements in the nature of electroconductive inserts 10-A. Electroconductive inserts 8, are connected to the relay and computer mechanism by wires 19. Electroconductive inserts 10-A are connected to the relay and computer mechanisms by wires 20. Holding frame 1, is constructed of non-electroconductive material, so that inserts 8 and 10-A which are electroconductive will be well insulated from each other, and from other electroconductive material. Shallow holes or depressions 9, and deep holes or cavities 10, are arranged in a grid pattern, and exceed the number of prepunched holes 13 in printed formats 11; this permits a wide range of patterns of holes to be punched in printed formats 11, and this makes it difficult for a student to learn the different possible patterns of correct and incorrect responses. Printed and prepunched format 11, is identified by a sheet number, 14, and a code number, 15, for that series of instructional formats. This arrangement allows the student to use keyboard 28 to direct the computer 25 as to the series, sheet number, and other data, before responding to questions: A, B, C, D, & E on the surface of format 11.

In the use of this invention, the student uses an electroconductive stylus 18 illustrated in A and B positions in FIG. 2. The stylus 18 is suitably grounded electrically so that when stylus 18 is pushed through prepunched hole 13 in format 11, the conical tip of the stylus will penetrate blank sheet 16 at the sites indicated by broken lines 17, and will contact an electroconductive insert 8 (positions A) or an electroconductive insert 10-A (positions B) to complete an electric circuit. When the electric circuit is completed, this information is conveyed over wires 19 or wires 20, to relay station 21, where it is further relayed to: sound feedback 22, visual feedback 23, counters 24, and computer 25. From computer 25, the information can be instantly displayed on a video tube 26, or displayed by a print out means 27. Information in regard to date, the student name or number, the series number, and the sheet number, can all be stored in the memory of the computer for an accumulated record of the student's performance in terms of knowledge and skills mastered, and his or her rate of mastery. Computer 25 can also be programmed so that when the student gives appropriate identifying data, such as series number and sheet number, that the computer can direct appropriate sound feedback, such as voice instruction from within the computer, or from audio tape. Sound feedback 22 can also indicate the correctness or incorrectness of the student's response by voice or other sound means.

It should also be noted that as the stylus 18 penetrates the unprinted sheet 16, it produces holes of two different sizes in the unprinted paper. This is the result of the tapered (conical) tip being inserted into either a shallow hole (position A) or a deep hole (position B).

Figure 3:
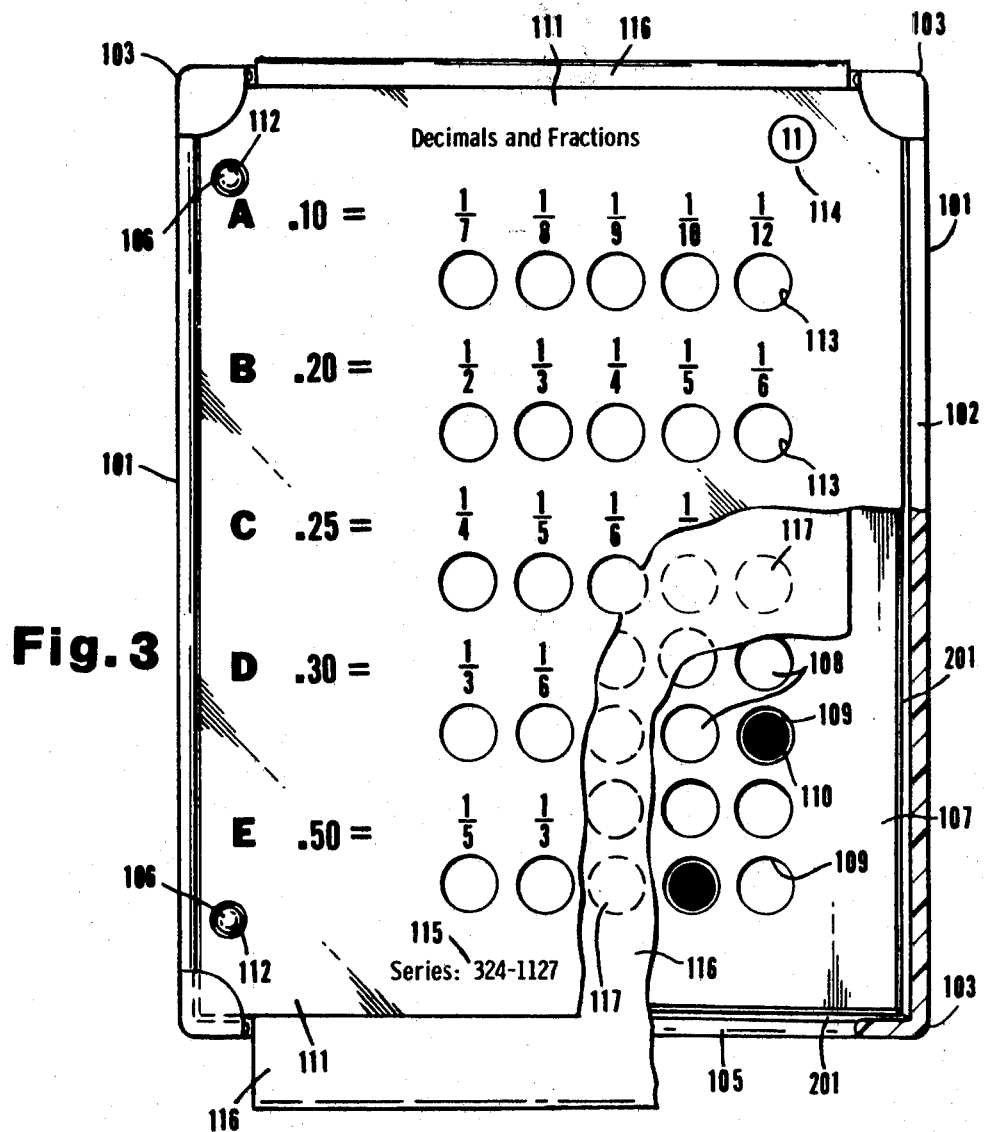
FIG. 3 is a plan view of a slightly different version of this invention than is illustrated in FIGS. 1 & 2.

Referring to FIGS. 3 and 4, the principles of operation are similar to the principles of operation described previously for FIGS. 1 and 2, but the means of construction is different. In FIGS. 3 and 4, printed and prepunched format 111 has two types of holes punched in it, holes 113, which are holes in the response areas or zones, and holes 112, that are used to properly position the format 111 within frame 101, by placing holes 112 over positioning pins 106. A thick sheet of non-electroconductive material 107 presents the upper surface of the holding mechanism, and has holes or apertures 109 punched in its surface on a grid pattern. Immediately under non-electroconductive sheet 107, is a sheet of electroconductive material 108. At the site of some holes 109 in sheet 107, additional holes have been punched in sheet of electroconductive material 108, and these holes or openings designated 208, in FIG. 4, have the same center as holes 109, but are larger in diameter than holes 109. This arrangement permits stylus 118 to be pushed through hole 113 in format 111, and penetrate unprinted sheet 116, and pass through hole 109, and also pass through hole 208, enter the space below electroconductive sheet 108, and finally contact electroconductive inserts or elements 110-A, to record that a correct response has been made. Blank or unprinted sheet 116 is sandwiched between the upper surface of non-electroconductive sheet of material 107, and the printed and prepunched instructional format 111. Broken lines 117, on blank sheet 116, indicate the potential sites where stylus 118 can penetrate blank sheet 116. By having holes 208 be larger in diameter than holes 109, but having the same center axis, electroconductive stylus 118 can be passed through hole 208 without contacting its edge, and causing a closed circuit.

Printed on format 111 are five questions: A, B, C, D, & E. Each question has five possible answer choices, only one of which is correct. The five possible answer choices to each question are indicated by holes 113, and the printed choice immediately above these holes 113 as printed on format 111. Holes 113 in format 111, lie directly above some of the holes 109 punched in sheet of non-electroconductive material 107. Holes 208 are punched in electroconductive sheet 108 at the sites of all correct responses, and all holes 110 are deep holes, made by punching holes 208 in sheet 108. At the bottom of all deep holes 110 are electrical contact elements in the nature of electroconductive inserts 110-A. All holes 109 are shallow holes or depressions, and sheet of electroconductive material 108 forms the bottom of these holes. In this preferred arrangement, all incorrect answers will be printed on prepunched formats 111, so that the answer area for this incorrect response will correspond to a shallow hole or depression 109. All deep holes or depressions 110, are the answer areas where correct responses are to be placed.

Printed and prepunched formats 111 are kept in proper position and alignment by: positioning pins 106 extending up through positioning holes 112; by ridges 102 on both sides of holding frame 101; and by overhanging corners 103; and by the upper surface of non-electroconductive sheet of material 107. Holding frame 101 is so constructed that lips 201 hold sheets of material 107 and 108 in a back to back position, and hold them in proper alignment within holding frame 101. Lips 301 of holding frame 101 hold non-electroconductive sheet of material 210 in proper position within holding frame 101. Snap rings 310, or similar holding means keep inserts 110-A in position within the holes punched in non-electroconductive sheet of material 210. Electroconductive stylus 118 is shown in both the A and the B positions fully inserted into shallow and deep holes respectively corresponding to incorrect and correct answers, and is shown to be grounded to the apparatus so that when the tip of stylus 118 contacts sheet of electroconductive material 108, or contacts electroconductive inserts 110-A, an electric circuit is completed, and this information is transmitted to relays 121 by way of wires 119 and 120. From relay 121 information as to the correctness or incorrectness of the student's response is then passed on to sound feedback 122, visual feedback 123, counters 124, and/or computer 125. As is illustrated and described in the Specification for FIGS. 1 and 2, when the stylus enters a deep hole 110 this indicates a correct response has been made; and when stylus 118 enters a shallow hole or depression 109, this indicates that an incorrect response has been made. The manner of processing the information after it has been passed to relays 121 is the same as is described in FIGS. 1 and 2.

This invention is an improvement over the previous art, in that in addition to giving the student immediate feedback as to the correctness or incorrectness of his or her responses by the depth of penetration of a stylus through a sheet of blank paper, and by observing the size of the hole produced by a stylus with a cone shaped tip, this invention also allows the student to receive a wide variety of additional types of immediate feedback, and allows his or her responses to be stored in the memory of a computer, and the student's performance can then be analyzed as to skills and knowledge mastered, and skills and knowledge yet to be mastered.

Having thus described the invention, what is claimed as new, and is desired to be secured by Letters Patent is:

1. An instructional apparatus comprising:

an instructional sheet having zones thereon indicating at least two types of answer choices, correct and incorrect, a holding mechanism provided with an upper surface for receiving said sheet, said mechanism having structure presenting said surface and defining relatively shallow and deep holes therethrough representing said types of answer choices, and further having means engageable with said sheet for holding the same on said surface in overlying relationship thereto with said zones in alignment with corresponding holes, said structure having electrical contact means in the bottoms of said shallow and deep holes, a stylus for selecting zones representing a student's answer choices, and provided with an electroconductive end portion engageable with the contact means in the hole corresponding to each zone selected upon insertion of said end portion thereinto, and circuit means connected to said end portion and said contact means for communicating the types of responses of a student to electrical information handling apparatus for processing and feedback.

2. The instructional apparatus as claimed in claim 1, wherein said contact means comprises contact elements defining the bottoms of corresponding holes, and wherein said stylus has a tip, presenting said conductive end portion, engageable with the element in the hole corresponding to the selected zone.

3. The instructional apparatus as claimed in claim 2, wherein said tip is tapered and said zones have sheet material therein through which said tip is punched in making a selection, whereby the size of each hole punched in said sheet material depends on the depth of the corresponding hole in said structure into which the stylus is inserted.

4. The instructional apparatus as claimed in claim 1, wherein said structure includes a base member presenting said upper surface and having depressions therein defining said shallow holes, said member further having means depending therefrom defining cavitites communicating with said surface to present said deep holes, and wherein said contact means comprises an individual contact element in each of said depressions and cavities.

5. The instructional apparatus as claimed in claim 4, wherein said member and cavity-defining means are electrically nonconductive, and wherein each of said contact elements comprises an electrically conductive insert in the bottom of the corresponding depression or cavity.

6. The instructional apparatus as claimed in claim 1, wherein said upper surface has a pattern of apertures therein, said structure comprising an upper, electrically conductive sheet member spaced beneath said surface and presenting the bottoms of said shallow holes, and a lower member spaced beneath said upper member and presenting the bottoms of said deep holes, said upper member having openings therethrough at the locations of said deep holes, and wherein said electrical contact means includes said upper member and conductive means on said lower member.

7. The instructional apparatus as claimed in claim 6, wherein said structure further comprises a first sheet of nonconductive material above said upper sheet member and presenting said apertured surface.

8. The instructional apparatus as claimed in claim 6, wherein said conductive means on said lower member includes individual contact elements thereon aligned with corresponding openings in said upper member for engagement by said stylus upon insertion therethrough.

* * * * *

UNITED STATES PATENT AND TRADEMARK OFFICE
CERTIFICATE OF CORRECTION

PATENT NO. : 4,453,920
DATED : June 12, 1984
INVENTOR(S) : J. RICHARD HARTE

It is certified that error appears in the above—identified patent and that said Letters Patent is hereby corrected as shown below:

Column 1, line 62, change "analyize" to --analyzes--.

Column 2, line 23, delete the comma after "11".

Column 2, line 25, delete [or zones] after "openings"; same line, insert a comma after "12".

Column 2, line 31, add --or zones-- after the word "openings".

Column 2, line 32, delete the comma after "13" first and second occurrence; same line, delete the comma after "11".

Column 3, line 8, change "(positions A)" to --(position A)--.

Column 3, line 9, change "tions B)" to --tion B)--.

UNITED STATES PATENT AND TRADEMARK OFFICE
CERTIFICATE OF CORRECTION

PATENT NO. : 4,453,920
DATED : June 12, 1984
INVENTOR(S) : J. RICHARD HARTE

It is certified that error appears in the above—identified patent and that said Letters Patent is hereby corrected as shown below:

Column 4, line 1, delete the period after "B" and insert a comma therein.

Column 4, line 23, change "alignment by:" to --alignment by--.

Column 6, Claim 4, line 7, change "cavitites" to --cavities--.

Signed and Sealed this

Thirtieth Day of July 1985

[SEAL]

Attest:

DONALD J. QUIGG

Attesting Officer   Acting Commissioner of Patents and Trademarks